United States Patent [19]
Leidemann et al.

[11] Patent Number: 5,579,355
[45] Date of Patent: Nov. 26, 1996

[54] HEAT DISSIPATION SYSTEM FOR A NUCLEAR REACTOR, IN PARTICULAR A PRESSURIZED WATER REACTOR

[75] Inventors: Werner Leidemann, Obermichelbach; Pius Mackert, Erlangen; Heinz-Werner Hartmann, Buckenhof, all of Germany

[73] Assignee: Siemens Aktiengesellschaft, Munich, Germany

Related U.S. Application Data

[63] Continuation of PCT/DE94/00234, Mar. 3, 1994.

[21] Appl. No.: 526,413

[22] Filed: Sep. 11, 1995

[30] Foreign Application Priority Data

Mar. 10, 1993 [DE] Germany .................. 43 07 543.6

[51] Int. Cl.$^6$ ........................................ G21C 9/00
[52] U.S. Cl. .............. 376/298; 376/299; 376/306; 376/290; 376/210
[58] Field of Search ................... 376/298, 299, 376/306, 290, 210; 976/DIG. 192, DIG. 142

[56] References Cited

U.S. PATENT DOCUMENTS

| | | | |
|---|---|---|---|
| 3,819,476 | 6/1974 | Pocock | 376/306 |
| 4,051,892 | 10/1977 | Reinsch | 165/107 |
| 4,066,499 | 1/1978 | Buthmann | 376/298 |
| 4,755,352 | 7/1988 | Glen et al. | 375/404 |
| 4,830,815 | 5/1989 | Gluntz | 376/299 |
| 4,863,676 | 9/1989 | Helm et al. | 376/299 |

FOREIGN PATENT DOCUMENTS

| | | |
|---|---|---|
| 0533529 | 3/1993 | European Pat. Off. . |
| 0541167 | 5/1993 | European Pat. Off. . |
| 2535729 | 2/1977 | Germany . |
| 2622050 | 12/1977 | Germany . |
| 4032736 | 4/1992 | Germany . |
| 4041295 | 7/1992 | Germany . |
| 910067 | 11/1982 | U.S.S.R. . |
| 990000 | 8/1987 | U.S.S.R. . |

OTHER PUBLICATIONS

Patent Abstract of Japan No. JP 2–47586(A), (Osawa et al), Feb. 16, 1990.
Patent Abstract of Japan No. JP 54–65296 (Katou) May 25, 1979.

*Primary Examiner*—Charles T. Jordan
*Assistant Examiner*—Meena Chelliah
*Attorney, Agent, or Firm*—Herbert L. Lerner; Laurence A. Greenberg

[57] ABSTRACT

A nuclear reactor, in particular a pressurized water reactor, has a containment, a containment shell surrounding the containment and a concrete construction of a reactor building surrounding the containment shell. A heat dissipation system for the nuclear reactor includes a sump volume disposed in a lower region of the containment shell for receiving coolant. A sump cooler is disposed inside the sump volume, has cooling tubes with a primary side and a secondary side and has feed and return lines. The primary side of the cooling tubes is covered at least when the sump volume is largely filled with coolant. An intermediate cooler has a tertiary side and is connected through the feed and return lines of the sump cooler to the secondary side of the cooling tubes. A heat sink is disposed outside the reactor building and is connected to the intermediate cooler on the tertiary side.

21 Claims, 3 Drawing Sheets

HEAT DISSIPATION SYSTEM FOR A NUCLEAR REACTOR, IN PARTICULAR A PRESSURIZED WATER REACTOR

CROSS-REFERENCE TO RELATED APPLICATION

This application is a Continuation Of International Application Ser. No. PCT/DE94/00234, filed Mar. 3, 1994.

BACKGROUND OF THE INVENTION

Field of the Invention

The invention relates to a heat dissipation system for a nuclear reactor, in particular for a pressurized water reactor, having a containment shell which is surrounded by a concrete construction of a reactor building and in turn surrounds the nuclear reactor as its containment, and a sump volume in a lower region of the containment shell for receiving coolant.

As the point of departure for the present invention, it is noted that such a heat dissipation system could make it possible to increase the inherent safety of nuclear reactor plants, either by retrofitting existing nuclear power plants, especially of the pressurized water reactor type, or by new construction of nuclear reactor plants that are to be built. The heat dissipation system according to the invention should develop its advantageous effects both in so-called design malfunctions and in events that exceed design situations. It is especially the design-exceeding events (core meltdown accidents) that have gained increasing attention recently which require systematic devices for long-term residual heat and energy dissipation from the reactor containment shell, in order to minimize possible effects on the environment.

SUMMARY OF THE INVENTION

It is accordingly an object of the invention to provide a heat dissipation system for a nuclear reactor, in particular a pressurized water reactor, which overcomes the hereinaforementioned disadvantages of the heretofore-known devices of this general type and with which the incident residual heat can be safely dissipated along with a further buildup of pressure and temperature in the reactor containment shell, even in the intrinsically highly unlikely case of the occurrence of a core meltdown. Even today an undesired buildup of pressure can be averted by what is known as venting (filtered pressure reduction). By comparison, with redundance in addition to the venting, the invention seeks to fight one possible source of the pressure buildup in its creation phase, namely through the use of long term cooling of the incident residual heat.

With respect to the provisions for long-term heat dissipation from the reactor containment shell or the reactor building sump in former or existing plants, the primary-side safety systems (aftercooling chain) are utilized for that purpose. If the aftercooling chain is unavailable, then a further pressure rise must be prevented or a pressure reduction must be attained through the use of a discontinuous, filtered pressure relief of the reactor containment shell to the atmosphere (which has already been mentioned).

With the foregoing and other objects in view there is provided, in accordance with the invention, in a nuclear reactor, in particular for a pressurized water reactor, having a containment, a containment shell surrounding the containment and a concrete construction of a reactor building surrounding the containment shell, a heat dissipation system for the nuclear reactor, comprising a sump volume disposed in a lower region of the containment shell for receiving coolant; a sump cooler being disposed inside the sump volume, having cooling tubes with a primary side and a secondary side and having feed and return lines, the primary side of the cooling tubes being covered at least when the sump volume is largely filled with coolant; an intermediate cooler having a tertiary side, the intermediate cooler being connected through the feed and return lines of the sump cooler to the secondary side of the cooling tubes; and a heat sink being disposed outside the reactor building and being connected to the intermediate cooler on the tertiary side.

The advantages attainable with the invention are considered above all to be that the heat dissipation system according to the invention can be constructed as both an actively acting and a passively acting system.

In accordance with another feature of the invention, the assumption is that in the nuclear power plant to be protected, in particular a PWR plant, the supplies of boric acid needed for controlling a malfunction are stored from the very outset within the reactor building sump.

In accordance with a further feature of the invention, the supply of boric acid, which is stored in the lower region of the reactor containment shell, is partitioned off from the remainder of the building (concrete ceiling with steel subconstruction or purely steel construction). This ceiling construction simultaneously serves to receive the sump cooler or coolers, which include freely laid cooling coils, for instance.

In accordance with an added feature of the invention, the placement of sump coolers in the upper region of the constant boric acid supply of the reactor building sump, in combination with a suitable structural layout/geometry of the reactor building sump, means that an automatic recirculation of sump water is promoted. It can optionally be reinforced by additional guide devices. Moreover, a protected layout of the heat exchanger devices, such as cooling coils, can thus be assured. An internal cooling device moreover affords the advantage according to the invention that the contaminated sump water need not be carried to the outside, and in other words the cooling is thus carried out with the aid of an intermediate cooling circuit.

In accordance with an additional feature of the invention, the sump cooler, having cooling tubes which may in particular be provided in a multi pipe section array, is constructed with its cooling tubes in such a way, and is disposed within a chamber space of suitable rise height in such a way, that in the cooling mode, a natural circulation flow develops.

In accordance with yet another feature of the invention, the intermediate cooling circuit may be constructed as a natural circulation circuit, and/or a device may be provided for circulating the coolant in the intermediate cooling circuit through sump and intermediate coolers.

In accordance with yet a further feature of the invention, the feed and return lines of the sump cooler are extended through the wall of the containment shell to an intermediate cooler disposed outside the containment shell.

In accordance with yet an added feature of the invention, each of the feed and return lines can be shut off, and to that end are provided, preferably in a guide region located outside the containment shell, with at least one shutoff valve each.

In accordance with yet an additional feature of the invention, there is provided an intermediate cooling pump being incorporated into the intermediate circuit formed by the sump and intermediate coolers and by the feed and return lines connecting the two coolers.

In accordance with again another feature of the invention, the intermediate cooling pump is inserted into a branch of the return line that is located both outside the containment shell and between a shutoff valve and the secondary-side inlet of the intermediate cooler.

In accordance with again a further feature of the invention, the shutoff valves, intermediate cooler, intermediate cooling pump and connecting circuit lines are located inside an annular reactor building chamber that is located outside the containment shell and inside the reactor building.

The tertiary side of the heat dissipation system can also be constructed as both an actively acting and a passively acting system. In accordance with again an added feature of the invention, the actively acting heat dissipation system includes connecting the tertiary side of the intermediate cooler to the external heat sink, such as a river or cooling pond, through a recirculating pump, and corresponding feed and return line.

In accordance with a concomitant feature of the invention, if the tertiary circuit of the intermediate cooler, which is extended through an external heat sink, is disposed for operation by the natural circulation principle, then it is especially advantageous to use a natural draft cooling tower or air cooler as the external heat sink.

Other features which are considered as characteristic for the invention are set forth in the appended claims.

Although the invention is illustrated and described herein as embodied in a heat dissipation system for a nuclear reactor, in particular a pressurized water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
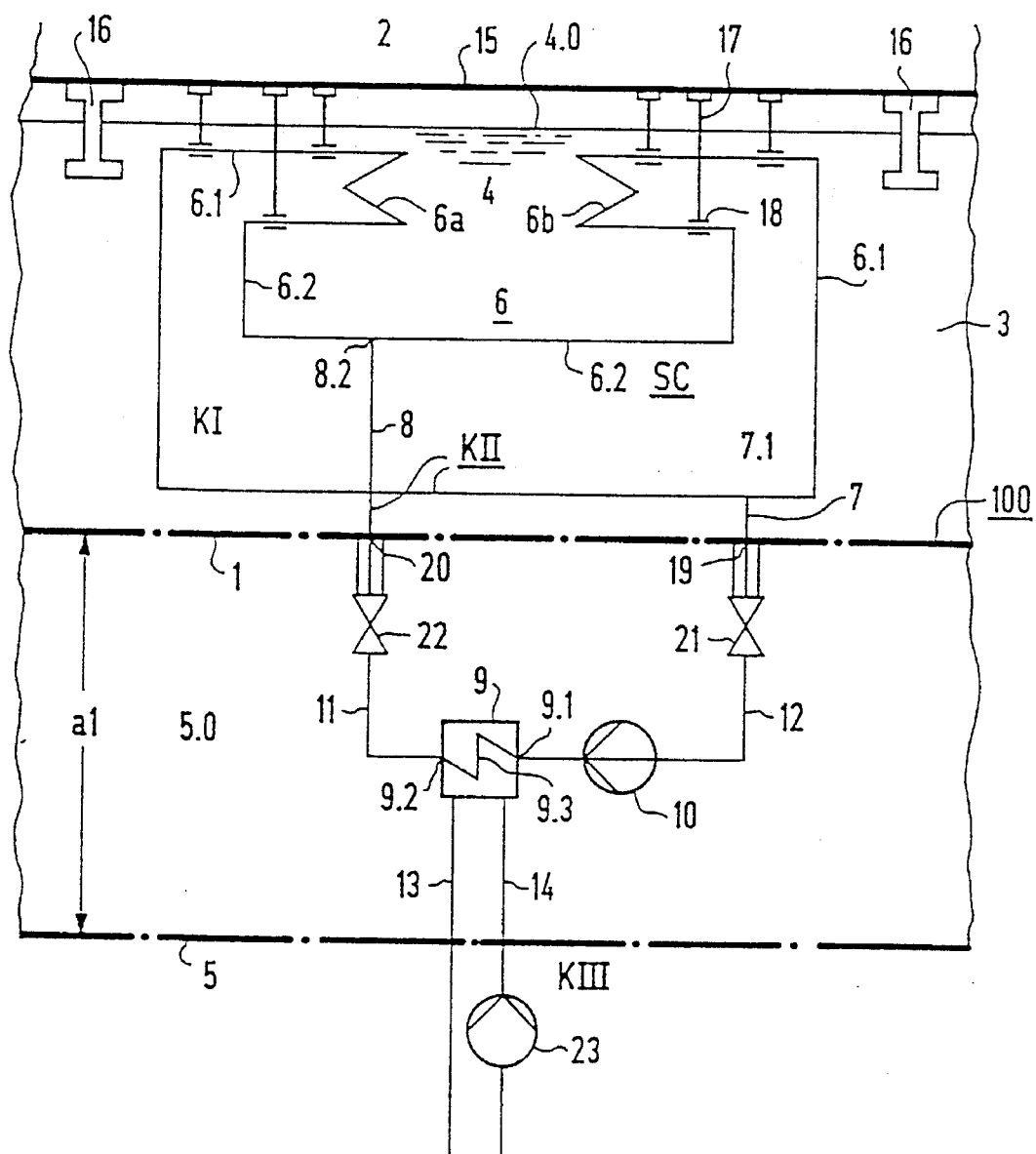
FIG. 1 is a fragmentary, diagrammatic, elevational view of a first heat dissipation system for a nuclear reactor plant, in particular a pressurized water reactor, which works with forced circulation in secondary and tertiary cooling circuits, and which works at least with a partial natural circulation in a primary cooling circuit of a sump cooler.

Referring now in detail to the figures of the drawing, which are simplified circuit diagrams leaving out those parts that are not essential to a comprehension of the invention, and first, particularly, to FIG. 1 thereof, there is seen a heavy dot-dashed line 1 that is shown in fragmentary fashion as part of a wall and which represents a steel sealing skin of a reactor containment shell 100, that by way of example may be spherical or cylindrical and has an interior which contains a so-called containment 2. The illustrated wall portion 1 of the reactor containment shell 100 is a bottom portion, and located above this bottom wall portion is a sump volume 3, which is likewise shown in fragmentary fashion, for receiving coolant 4. The sump volume may be filled with coolant, for instance up to a level 4.0, during normal operation of the reactor. It is also possible to have a lower sump water level that is not filled accordingly until an accident occurs, or a mode of operation is possible in which the sump volume 3 does not fill with sump water until there is an incipient incident. The containment 2 with its enveloping containment shell 100 is surrounded by walls of a reactor building, of which one wall portion 5 is shown again in heavy dot-dash lines. The wall portion 5 of the reactor building is spaced apart by a distance al, of from one to several meters, for instance, from the steel sealing skin 1, resulting in a so-called annular reactor building chamber 5.0 between the two wall portions 1, 5 that is kept at negative pressure to enable detection of any possible leaks through the steel sealing skin 1. In normal operation, atmospheric pressure prevails inside the containment 2.

Figure 2:
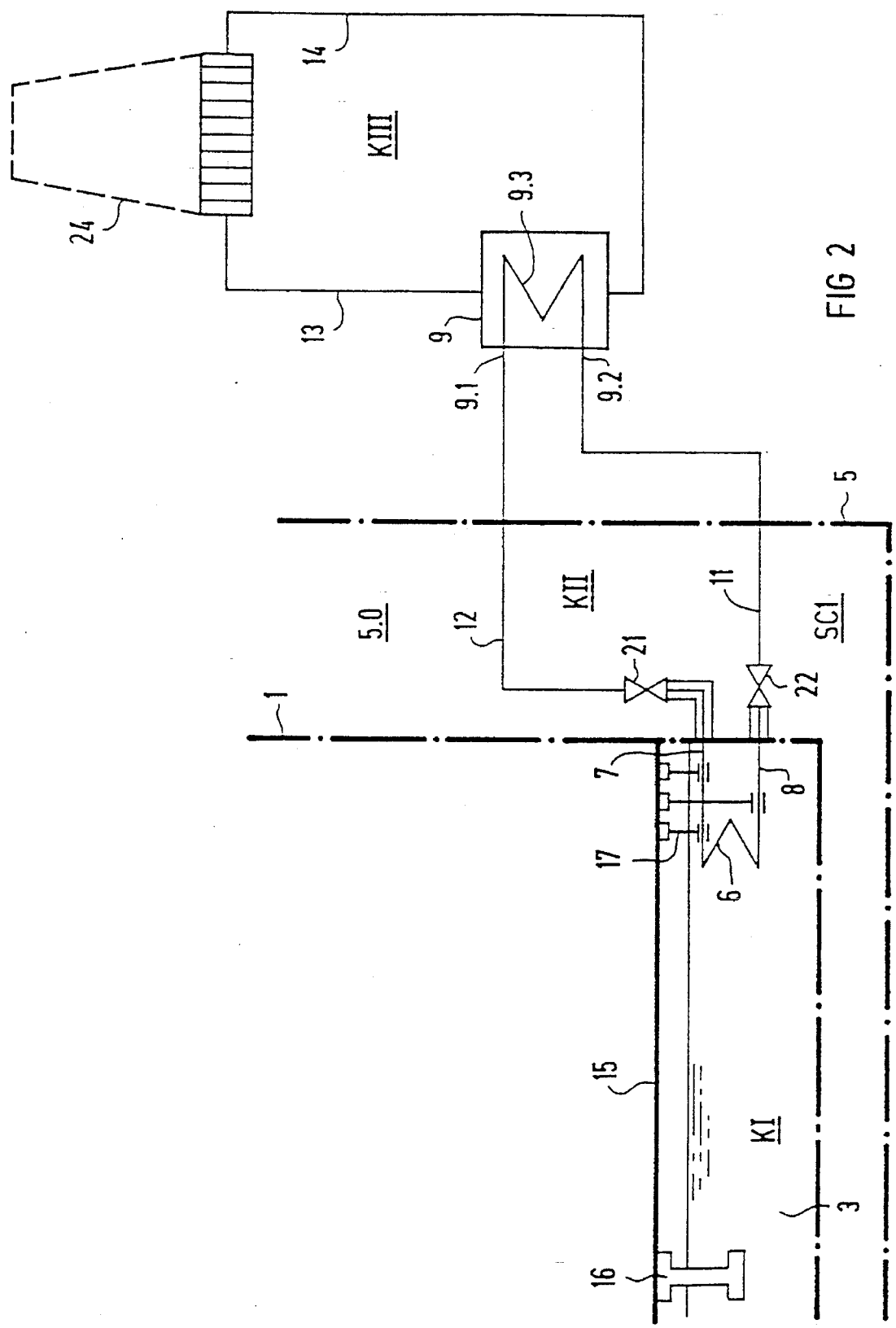
FIG. 2 is a fragmentary, elevational view of a second embodiment of a heat dissipation system for a nuclear reactor plant, especially a pressurized water reactor plant, which works with a natural circulation-recirculation of a coolant in secondary and tertiary cooling circuits, and in which an at least partial natural circulation of the coolant can occur in a primary circuit of the sump cooler.
Figure 3:
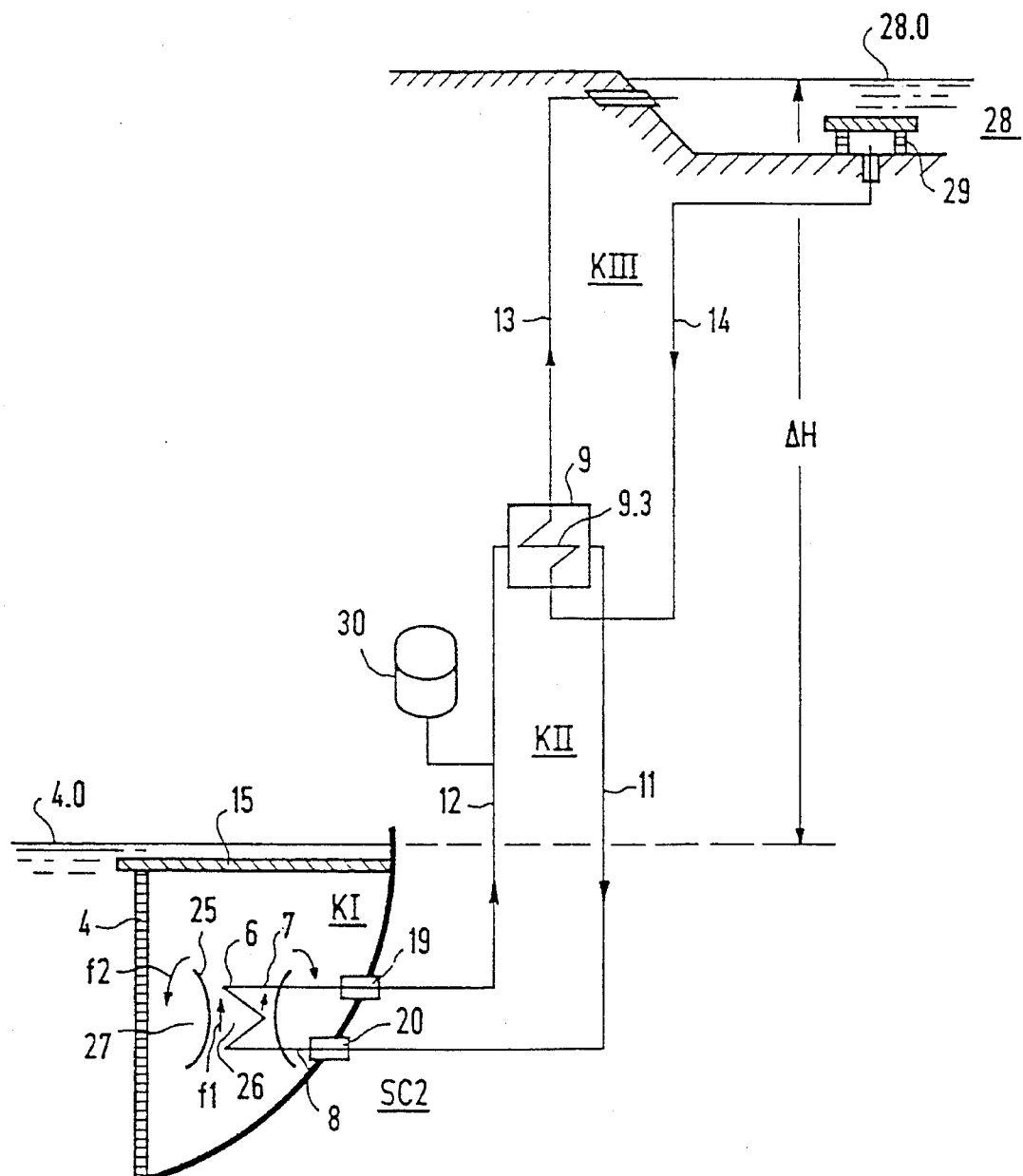
FIG. 3 is a fragmentary, elevational view of a third version of the heat dissipation system of the invention in which, in comparison with the embodiment of FIG. 2, natural circulation in a primary circuit is forced through guide walls, and work is carried out with a cooling pond (or river bed) as an external heat sink on a tertiary side.

A known reactor plant for which the invention can be used is shown and described in German Published, Non-Prosecuted Application DE 40 41 295 A1, corresponding to U.S. Pat. No. 5,343,506, for example. FIGS. 1–3 of that reference show a nuclear reactor plant with a so-called core catcher, in which a core melt is caught in a catching container below the reactor pressure vessel in the case of a core meltdown, and the catching container is cooled on its outside through the use of coolant from the reactor sump, preferably by natural circulation. In addition, the core melt is also cooled at its top by a film of coolant, and that cooling is likewise supplied by the sump coolant. The afterheat of decay, or residual heat, which is absorbed in this way by the sump coolant, is then dissipated advantageously in accordance with the invention, to which end reference will again first be made to FIG. 1. Within the sump volume 3, cooling tubes 6 of a sump cooler SC are disposed in such a way that at least when the sump volume 3 is largely filled with coolant 4 (as shown), the tubes are covered on the primary side. Two parallel-connected groups 6a, 6b of cooling tubes are shown. First pipe sections 6.1 of the groups 6a, 6b are united at a common line point 7.1 and discharge into a suction line 7. Second pipeline sections 6.2 of the cooling tubes 6 run together at a line point 8.2 and merge with a common pressure line 8. In the case shown, one can say that there are two loops 6a, 6b and four pipe sections, and as is schematically indicated, the cooling tubes may extend in a spiral or in a meandering pattern, for instance in a known manner, in order to attain the largest possible heat-exchanging surfaces. The sump cooler SC can also have more than two loops, for instance 3 or 4 or even more, and correspondingly then more than four pipe sections 6.1, 6.2.

A secondary side of the cooling tubes 6 is connected through the feed line (suction line) 7 and the return line (pressure line) 8 of the sump cooler SC to an intermediate cooler 9, and a device 10, 11, 12 is provided for circulating the coolant in the intermediate circuit through the sump SC and the intermediate cooler 9. The intermediate cooler 9 is connected on a tertiary side through lines 13, 14 to a heat sink, which is disposed outside the reactor building (wall 5)

and not shown in FIG. 1. The heat sink may be a river or a cooling pond, for instance.

FIG. 1 shows that the sump volume 3 contains a water supply, in this case a boric acid supply, and that a chamber space which defines the sump volume 3 is covered through the use of a ceiling construction 15. On each of two, illustrated ends of the sump volume 3, a strong double-T bearer 16 is shown, and these bearers are braced against a concrete structure of the containment, which is not visible in FIG. 1. The ceiling construction 15 in the case shown is constructed as a load-bearing steel construction. It may also be a steel-reinforced, load-bearing concrete ceiling. Advantageously, the tubes 6 of the sump cooler SC are retained on the ceiling construction 15, as is symbolized by tube retention hangers 17, which are each secured by upper ends thereof to the ceiling construction 15, for instance by welding, and are connected by lower ends thereof to tube sleeves 18 that surround the cooling tubes 6. In order to achieve an earth-quake-proof construction, the hangers 17 could also be reinforced with non-illustrated cross struts and joined together.

The feed and return lines 7, 8 of the sump cooler SC are extended through the wall portion 1 of the containment shell to the intermediate cooler 9. Wall leadthroughs are indicated by reference numerals 19 and 20.

The feed line 7 has a line branch or segment 12 and the return line 8 has a line branch or segment 11. The feed line 7, 12 and the return line 8, 11 can each be shut off, and to that end are each provided with at least one shutoff valve 21, 22, preferably in a guide region located outside the containment shell 1. An intermediate cooling pump 10 is incorporated into an intermediate circuit KII formed by the sump 3, the intermediate coolers SC, 9 and the feed and return lines 7, 12, 8, 11 connecting the two coolers SC, 9. The pump 10 is inserted into the line branch or segment 12 of the return line that is located both outside the containment shell and between the shutoff valve 21 and a secondary-side inlet 9.1 of the intermediate cooler 9. A secondary-side outlet of the intermediate cooler 9 is indicated by reference numeral 9.2. The intermediate cooler 9 has heat-exchanging tubes which are schematically illustrated between elements 9.1 and 9.2 and are indicated by reference numeral 9.3. The feed-side line branch or segment 11 is located between the secondary-side outlet 9.2 and the further shutoff valve 22. As can be seen, the shutoff valves 21, 22, the intermediate cooler 9, the intermediate cooling pump 10 and the connecting circuit lines 11, 12 are located inside the annular reactor building chamber 5.0 that is located outside the containment shell 1 and inside the reactor building 5. The illustrated heat dissipation system has the advantage of ensuring that the coolant 4, which is preferably boronized, is contained in the sump cooler SC and forms a primary side KI of the heat dissipation system, remains within the containment shell. This is advantageous because during the cooling of the core melt, which extends over a relatively long period of several days to several weeks, products of decomposition naturally collect in the coolant. Later, once the core melt has solidified and cooling is no longer necessary, those products can be removed by pumping out the sump cooler. The intermediate cooling circuit KII is intrinsically closed, as is shown, and is operated in circulation when the pump 10 is in operation. A circulatory mode effected by natural circulation is also possible, as will be described below. If a leak should occur at the cooling tubes 6, 6.1, 6.2 and if a certain amount of contaminated coolant should thus enter the intermediate cooling circuit, nevertheless nothing can penetrate to the outside, because the next barrier is the tubes of the intermediate cooler 9, and they do not allow any contaminated intermediate cooling medium to pass through to a tertiary side KIII.

In FIG. 1, a recirculating pump 23 is incorporated into the return line 14 of the tertiary side. Like the intermediate cooling pump 10, the recirculating pump 23 would operate continuously in the cooling mode, so that the incident afterheat of decomposition would be transported from the primary side KI through the intermediate circuit KII to the tertiary side KIII, or in other words to the external heat sink (river, cooling pond, air cooler or cooling tower).

The heat dissipation system of FIG. 2 is constructed in such a way that the circulation of the coolant in the intermediate cooling circuit KII is carried out by the principle of natural circulation, given a suitable geodetic height of the intermediate cooler 9 relative to a sump cooler SC1. An external heat sink 24 is constructed as an air cooler or cooling tower. The tertiary circuit or tertiary side KIII includes a jacket side of the intermediate cooler 10, its feed line 13, the external heat sink 24 and the return line 14. In accordance with the invention, this tertiary circuit is likewise constructed to operate by the natural circulation principle, to which end provision is made for a suitable geodetic height difference between the intermediate cooler and the external heat sink 24 (for instance, a height difference of from 5 to 10 m).

In the case of the sump cooler SC1 of FIG. 2 (as for the sump cooler SC of FIG. 1), it can be stated that it is especially advantageous to construct it with its cooling tubes 6 and to place it within the chamber space or volume 3 having a suitable rise height, in such a way that a natural circulation flow develops in the cooling mode. The intermediate cooler 9 of FIG. 2 may be disposed inside the annular chamber 5.0 or outside the annular chamber 5.0 as shown. The disposition inside the annular chamber 5.0 has the advantage of only placing the tertiary circuit KIII outside the reactor building 5.

FIG. 3 shows that for reinforcing the natural circulation in a sump cooler SC2 shown therein, guide devices 25 are associated with the cooling tubes 6, so that chute-like flow zones 26 for an upward flow in heat exchange with the cooling tubes 6 are formed, along with downward flow zones 27 outside those flow zones 26. Respective flow arrows are indicated by reference symbol f1 (upward) and f2 (downward). The guide devices 25 have the approximate shape of a rotational hyperboloid. In the embodiment of FIG. 3, the water level 4.0 is shown to be somewhat higher than the ceiling construction 15. This situation can occur as a function of operation or may be provided for from the very outset. Otherwise, the heat dissipation system of FIG. 3 is largely equivalent to that of FIG. 2. In this example, the rise height for the intermediate cooler 9 is approximately 10 m, which is equivalent to half the height difference between the lower water level 4.0 of the sump cooler SC2 and a water level 28.0 of an upper cooling pond 28. This height difference is indicated by reference symbol $\Delta H$. A compensation container 30 is connected to the feed line 12 of the intermediate cooling or secondary circuit KII.

The return line 14 on the tertiary side KIII is connected to the cooling pond 28 through a filter segment 29.

In heat dissipation operation, the coolant 4 in the sump cooler SC2 is heated by absorbing the afterheat of decomposition of the core melt, and it gives up its heat to the cooling tubes 6 of the sump cooler. As a result, a natural circulation within the sump cooler SC2 is stimulated, and a flow develops between the arrows f1 and f2. The secondary coolant in the intermediate cooling circuit KII is heated more strongly in the region of the feed pipe section 7 than in the region of the return pipe section 8, because relatively warmer layers of coolant are located in the region of this feed line 7. As a consequence, a natural circulation is stimulated in the intermediate cooling circuit as well. The relatively warmer water rises in the feed line 12, cools down in the intermediate cooler 9, and then "drops" back again in the return line branch or segment 11 into the return-side pipe section 8 of the sump cooler SC2. In a corresponding way, a natural circulation is stimulated on the tertiary side, in that relatively warmer quantities of water rise in the feed line 13 and flow into the cooling pond 28, where they combine with the cooler amounts of water. Relatively cooler coolant then flows afterwards through the filter 29 and through the return line 14 into the heat exchanging tubes 9.3 of the intermediate cooler 9. This natural circulation in the primary, secondary and tertiary systems KI–KIII is intrinsically safe and leads to an effective dissipation of the afterheat of decomposition into the relatively large heat sink 28 of a cooling pond or river. The stimulation of the natural circulation flow in the heat dissipation system of FIG. 2 takes place in a manner corresponding to that described for FIG. 3.

In the heat dissipation system of FIG. 1, a natural circulation-recirculation of the coolant 4 can advantageously be provided on the primary side KI (sump cooler SC), and a forced circulation with recirculating pumps is provided in this case on both the secondary and the tertiary sides KII, KIII. In order to bring about the required certainty of heat dissipation in this case, it is suitable to provide a non-illustrated plurality of pumps 10 and 23, connected parallel to one another.

We claim:

1. In a nuclear reactor having a containment, a containment shell surrounding the containment and a concrete construction of a reactor building surrounding the containment shell, a heat dissipation system for the nuclear reactor, comprising:
   a) a sump volume disposed in a lower region of the containment shell for receiving coolant;
   b) a sump cooler being disposed inside said sump volume, having cooling tubes with a primary side and a secondary side and having feed and return lines, said primary side of said cooling tubes being covered at least when said sump volume is largely filled with coolant;
   c) an intermediate cooler having a tertiary side, said intermediate cooler being connected through said feed and return lines of said sump cooler to said secondary side of said cooling tubes; and
   d) a heat sink being disposed outside the reactor building and being connected to said intermediate cooler on said tertiary side.

2. The heat dissipation system according to claim 1, wherein said sump volume contains a supply of boric acid.

3. The heat dissipation system according to claim 1, including a ceiling construction covering a chamber space defining said sump volume.

4. The heat dissipation system according to claim 3, wherein said cooling tubes of said sump cooler are retained on said ceiling construction.

5. The heat dissipation system according to claim 4, wherein said ceiling construction is a load-bearing steel construction.

6. The heat dissipation system according to claim 4, wherein said ceiling construction is a steel-reinforced, load bearing concrete ceiling.

7. The heat dissipation system according to claim 1, wherein said cooling tubes of said sump cooler are disposed in a multi pipe section array.

8. The heat dissipation system according to claim 1, wherein said sump cooler with said cooling tubes is disposed within a chamber space having a rise height developing a natural circulation flow in a cooling mode.

9. The heat dissipation system according to claim 8, including guide devices associated with said cooling tubes for reinforcing the natural circulation and for forming chute-like flow zones for an upward flow in heat exchange with said cooling tubes and downward flow zones outside the upward flow zones.

10. The heat dissipation system according to claim 1, wherein said containment shell has a wall, said intermediate cooler is disposed outside said containment shell, and said feed and return lines of said sump cooler are extended through said wall to said intermediate cooler.

11. The heat dissipation system according to claim 10, wherein each of said feed and return lines has at least one shutoff valve.

12. The heat dissipation system according to claim 11, wherein said shutoff valves are disposed in a guide region outside the containment shell.

13. The heat dissipation system according to claim 1, wherein said sump cooler, said intermediate cooler and said feed and return lines interconnecting said coolers form an intermediate cooling circuit, and the coolant is circulated in said intermediate cooling circuit through said sump cooler and said intermediate cooler.

14. The heat dissipation system according to claim 13, including an intermediate cooling pump disposed in said intermediate cooling circuit.

15. The heat dissipation system according to claim 14, wherein said intermediate cooler has a secondary-side inlet, said feed line has a shutoff valve, said feed line has a branch disposed outside the containment shell and between said shutoff valve and said secondary-side inlet of said intermediate cooler, and said intermediate cooling pump is disposed in said branch.

16. The heat dissipation system according to claim 14, wherein said feed and return lines have connecting circuit lines and shutoff valves disposed in said connecting circuit lines, and said shutoff valves, said intermediate cooler, said intermediate cooling pump and said connecting circuit lines are located inside an annular reactor building chamber disposed outside the containment shell and inside the reactor building.

17. The heat dissipation system according to claim 1, including a recirculating pump and corresponding feed and return lines connecting said tertiary side of said intermediate cooler to said external heat sink.

18. The heat dissipation system according to claim 17, wherein said external heat sink is a river or cooling pond.

19. The heat dissipation system according to claim 13, wherein said intermediate cooler has a geodetic height relative to said sump cooler causing recirculation of the coolant in said intermediate cooling circuit by the natural circulation principle.

20. The heat dissipation system according to claim 1, wherein said heat sink is an external heat sink, and said intermediate cooler has a tertiary circuit extending through said external heat sink for operation by the natural circulation principle.

21. The heat dissipation system according to claim 20, wherein said external heat sink is a natural draft cooling tower to air cooler.

* * * * *